(12) United States Patent
Zelsmann et al.

(10) Patent No.: US 12,019,397 B2
(45) Date of Patent: Jun. 25, 2024

(54) METHOD OF FORMING A COMPLEX IMAGE OF A SAMPLE

(71) Applicants: Commissariat à l'Energie Atomique et aux Energies Alternatives, Paris (FR); CENTRE NATIONAL DE LA RECHERCHE SCIENTIFIQUE, Paris (FR); UNIVERSITÉ GRENOBLE ALPES, Saint Martin d'heres (FR)

(72) Inventors: Marc Zelsmann, Biviers (FR); Pierre Marcoux, Grenoble (FR); Emmanuel Picard, Grenoble (FR)

(73) Assignees: Commissariat à l'Energie Atomique et aux Energies Alternatives, Paris (FR); CENTRE NATIONAL DE LA RECHERCHE SCIENTIFIQUE, Paris (FR); UNIVERSITÉ GRENOBLE ALPES, Saint Martin D'heres (FR)

( * ) Notice: Subject to any disclaimer, the term of this patent is extended or adjusted under 35 U.S.C. 154(b) by 91 days.

(21) Appl. No.: 17/646,208

(22) Filed: Dec. 28, 2021

(65) Prior Publication Data

US 2022/0214648 A1 Jul. 7, 2022

(30) Foreign Application Priority Data

Dec. 28, 2020 (FR) .................... 20 14180

(51) Int. Cl.
*G03H 1/08* (2006.01)
*G03H 1/04* (2006.01)
(Continued)

(52) U.S. Cl.
CPC .......... *G03H 1/0891* (2013.01); *G03H 1/0443* (2013.01); *G06T 5/50* (2013.01);
(Continued)

(58) Field of Classification Search
CPC ............... G03H 1/0891; G03H 1/0443; G03H 2001/0452; G03H 2226/02; H04N 23/56;
(Continued)

(56) References Cited

U.S. PATENT DOCUMENTS 6,262,818 B1 * 7/2001 Cuche .................. G03H 1/0866
359/9
2017/0168285 A1 * 6/2017 Ozcan ................ G02B 21/0056
(Continued)

FOREIGN PATENT DOCUMENTS

WO WO 2019/224474 A1 11/2019

OTHER PUBLICATIONS

French Preliminary Search Report dated Sep. 13, 2021 in French Application 20 14180 filed on Dec. 28, 2020 (with English Translation of Categories of Cited Documents and Written Opinion), 9 pages.

*Primary Examiner* — James T Boylan
(74) *Attorney, Agent, or Firm* — Oblon, McClelland, Maier & Neustadt, L.L.P.

(57) ABSTRACT

A method for obtaining an image of a sample includes illuminating the sample using a light source; acquiring, using an image sensor, a first image of the sample, the image being formed in the detection plane, the first image being representative of an exposure light wave propagating, from the sample, to the image sensor, along a first optical path; modifying an optical refractive index, between the image sensor and the sample; acquiring a second image of the sample, the image being representative of the exposure light wave along a second optical path; and implementing an iterative algorithm that combines the first and second images so as to obtain an image of the sample.

11 Claims, 5 Drawing Sheets

(51) Int. Cl.
*G06T 5/50* (2006.01)
*H04N 23/56* (2023.01)

(52) U.S. Cl.
CPC ..... *H04N 23/56* (2023.01); *G03H 2001/0452* (2013.01); *G03H 2210/55* (2013.01); *G03H 2226/02* (2013.01); *G06T 2207/30004* (2013.01)

(58) Field of Classification Search
CPC ............ G06T 5/50; G06T 2207/30004; G04H 2210/55
See application file for complete search history.

(56) References Cited

U.S. PATENT DOCUMENTS

| | | | |
|---|---|---|---|
| 2017/0220000 A1* | 8/2017 | Ozcan | H04N 23/698 |
| 2020/0124586 A1* | 4/2020 | Herve | G01N 15/1475 |
| 2020/0402273 A1* | 12/2020 | Herve | G03H 1/0866 |
| 2021/0264214 A1* | 8/2021 | Ozcan | G06F 18/2148 |
| 2021/0310787 A1* | 10/2021 | Aubry | G02B 21/365 |
| 2021/0320808 A1* | 10/2021 | Piestun | H04L 9/38 |
| 2023/0168180 A1* | 6/2023 | Allier | C12M 41/46 |
| | | | 382/133 |

* cited by examiner

METHOD OF FORMING A COMPLEX IMAGE OF A SAMPLE

TECHNICAL FIELD

The technical field of the invention is holographic reconstruction of an image containing diffraction patterns.

PRIOR ART

The observation of samples, and in particular biological samples, by lensless imaging, has undergone significant advances in the last ten years. This technique allows a sample to be observed by positioning it between a light source and an image sensor, without positioning an optical magnifying lens between the sample and the image sensor. The image sensor thus collects an image of the light wave that is transmitted by the sample.

This image is formed of interference patterns between the light wave emitted by the light source and transmitted by the sample and diffraction waves resulting from the diffraction, by diffracting objects, of the sample of the light wave emitted by the source. These interference patterns are sometimes referred to using the term "diffraction patterns".

Lensless imaging thus appears to be a simple and inexpensive alternative to a conventional microscope. Moreover, its field of observation is significantly larger than is possible for that of a microscope. It will thus be understood that the prospective applications related to this technology are many and various.

Generally, the image acquired by the image sensor is a hologram, containing interference patterns. It does not have a sufficient spatial resolution to be used directly, notably when it is desired to obtain a precise representation of the sample. The hologram is generally processed by a holographic reconstruction algorithm. Such algorithms are well known in the field of holographic reconstruction. However, holographic reconstruction algorithms may result in reconstruction noise in the reconstructed image, referred to by the term "twin image". This is primarily due to the fact that the image formed on the image sensor does not include information relating to the phase of the light wave reaching this sensor. Thus, the holographic reconstruction is carried out on the basis of optical information that is complete, because it is based solely on the intensity of the light wave collected by the image sensor.

Improvement of holographic-reconstruction quality has been the subject of much work, employing algorithms that are frequently called "phase retrieval" algorithms, allowing the phase of the light wave to which the image sensor is exposed to be estimated.

Certain algorithms are based on applying a mask to a reconstructed image. The mask allows reconstructed-image regions in which the sample may be considered to contain no diffracting objects to be delineated. These regions of the image are used by way of phase reference, so as to be able to estimate the phase shift induced by each diffracting object. However, such a method assumes that the density of the diffracting objects in the sample is not too high, so as to be able to delineate regions free of diffracting objects. Other reconstruction algorithms are based on successive acquisitions of holograms of the sample, the image sensor being moved with respect to the sample between the acquisitions. However, this assumes a precise movement of the image sensor with respect to the sample. This detracts from the simplicity of the device.

The inventors provide a method for obtaining an image of a sample via a holographic-reconstruction method, employing a simple observing device, and not requiring movement of the image sensor relative to the sample. Furthermore, the method is not limited by any constraints relative to the density of the sample.

SUMMARY OF THE INVENTION

A first subject of the invention is a method for obtaining an image of a sample, comprising the following steps:
  a) illuminating the sample using a light source configured to emit a light wave that propagates to the sample;
  b) acquiring, using an image sensor, a first image of the sample, said image being formed in a detection plane, the sample being placed between the light source and the image sensor, the first image being representative of an exposure light wave propagating from the sample, to the image sensor, along a first optical path;
  the method being characterized in that it also comprises, following step b)
  c) modifying an optical refractive index, between the image sensor and the sample, so as to obtain a variation in the optical path of the exposure light wave;
  d) following step c), acquiring, using the image sensor, a second image of the sample, said image being formed in the detection plane, the second image being representative of the exposure light wave propagating, from the sample, to the image sensor, along a second optical path, the second optical path corresponding to the first optical path plus the variation in optical path resulting from step c);
  e) implementing an iterative algorithm comprising the following sub-steps:
    ei) forming an initial image, in the detection plane, from a starting image chosen from the first image and the second image;
    eii) applying a holographic propagation operator to the initial image or to a complex image formed in the detection plane and resulting from a previous iteration, so as to obtain a reconstructed complex image in a reconstruction plane, the distance between the reconstruction plane and the detection plane corresponding to the variation in optical path obtained in step c), the complex image formed in the reconstruction plane having a modulus and phase defined in each pixel of said image;
    eiii) in the reconstruction plane, updating the modulus of the complex image formed in the reconstruction plane, and resulting from eii), in each of the pixels thereof, depending on a destination image, the destination image being chosen from the first image or the second image, the destination image being different from the starting image chosen in step ei);
    eiv) applying a holographic propagation operator to the updated complex image of eiii), to form a complex image in the detection plane, the complex image formed in the detection plane having a modulus and phase defined in each pixel of said image;
    ev) updating the modulus of the complex image formed in the detection plane in eiv), in each of the pixels thereof, depending on the starting image;
    evi) reiterating substeps eii) to ev) until a criterion for stopping the iterations is met;
  f) obtaining an image of the sample from a complex image resulting from step e), said image being formed in the detection plane or in the reconstruction plane.

According to one embodiment:
in step eiii) the complex image, in the reconstruction plane, is updated by replacing, in each of the pixels thereof, the modulus of said image by the square root of the destination image;
in step ev) the complex image, in the detection plane, is updated by replacing, in each of the pixels thereof, the modulus of said image by the square root of the starting image.

According to one embodiment, the criterion for stopping the iterations is a pre-set number of iterations of substeps eii) to ev).

According to one embodiment, step evi) of each iteration, after the first iteration, comprises computing a mean phase deviation, the mean phase deviation comprising:
a mean deviation between the phases of each pixel of the complex image formed, in the reconstruction plane, in step eii) of the iteration and in the previous iteration;
or a mean deviation between the phases of each pixel of the complex image formed, in the detection plane, in step eiv) of the iteration and in the previous iteration;
the criterion for stopping the iterations being met when the mean deviation drops below a pre-set threshold or when a difference in mean deviation, between two successive iterations, drops below a pre-set threshold.

According to one embodiment,
during the acquisition of the first image, a first material, having a first refractive index, lies between the sample and the image sensor;
step c) comprises replacing all or some of this first material by a second material, the second material having a second refractive index different from the first refractive index so that the second optical path is longer or shorter than the first optical path.

Advantageously, the distance between the image sensor and the sample is identical in steps b) and d).

According to one embodiment, no image-forming optics are placed between the image sensor and the sample. According to another embodiment, an optical system lies between the sample and the image sensor, the optical system defining an object plane and an image plane;
the sample lies in a sample plane, the sample plane being offset with respect to the object plane;
and/or the detection plane is offset with respect to the image plane.

In step f), the image of the sample may be obtained by applying a reconstruction operator:
to the complex image formed in the detection plane in the last iteration of substeps eii) to ev);
or to the complex image formed in the reconstruction plane, in the last iteration of substeps eii) to ev).

A second subject of the invention is a device for observing a sample, comprising:
a light source configured to illuminate the sample;
an image sensor configured to acquire an image of the sample;
a sample holder configured to hold the sample between the light source and the image sensor;
the device being configured to allow there to be placed, between the sample and the image sensor:
either a first material, of a first refractive index, so as to allow a first image of the sample to be acquired, by the image sensor, when the first material is placed between the sample and the image sensor;
or a second material, instead of the first material, of a second refractive index different from the first refractive index, so as to allow a second image of the sample to be acquired, by the image sensor, when the second material is placed between the sample and the image sensor;
the device comprising a processing unit (30) that is programmed to implement steps e) and f) of a method according to the first subject of the invention.

Advantageously, the sample holder is fixed with respect to the image sensor, such that the distance between the sample and the image sensor is identical during the acquisition of the first image and during the acquisition of the second image.

The device may comprise features described with reference to the first subject of the invention.

The invention will be better understood on reading the description of the examples of embodiment, which are described, in the rest of the description, with reference to the figures listed below.

FIGURES

DESCRIPTION OF PARTICULAR EMBODIMENTS

Figure 1A:
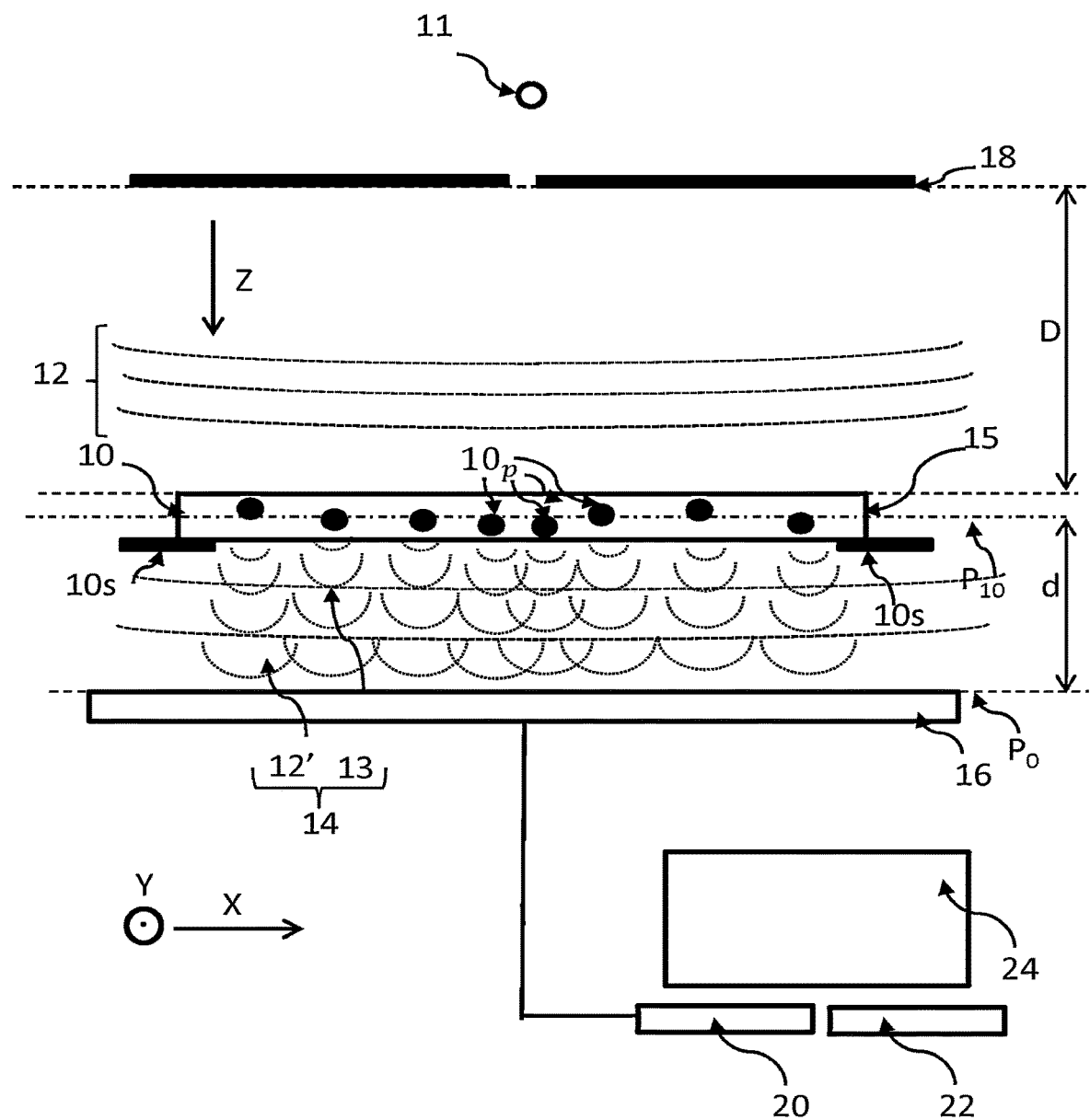
FIGS. 1A and 1B show a first example of a device allowing the invention to be implemented, in a lensless-imaging configuration.

FIG. 1A shows an example of a device according to the invention. A light source 11 is configured to emit a light wave 12, called the incident light wave, that propagates in the direction of a sample 10, along a propagation axis Z. The light wave is emitted in a spectral band $\Delta\lambda$, comprising a wavelength $\lambda$. This wavelength may be a central wavelength of said spectral band.

The sample 10 is a sample that it is desired to characterize. It may contain diffracting elements, particles 10$p$ for example. The particles 10$p$ may be blood particles, red blood cells for example. They may also be cells, microorganisms, for example bacteria or yeasts, microalgae, microbeads or insoluble droplets in a liquid medium, lipid nanoparticles for example. Preferably, the particles 10$p$ have a diameter, or are inscribed within a diameter, smaller than 1 mm, and preferably smaller than 100 µm. They are microparticles (diameter smaller than 1 mm) or nanoparticles (diameter smaller than 1 µm). The medium in which the particles are suspended may be a liquid medium, for example a liquid phase of a bodily fluid, of a culture medium or of a liquid taken from the environment or from an industrial process. It may be a solid medium or be gel-like in consistency, for example an agar-like substrate suitable for the growth of colonies of bacteria.

The sample may also be a solid sample, for example a thin slide of biological tissue, such as a pathology slide, or a dry extract of a fluid, of a biological fluid for example. In this case, the diffracting elements of the sample are particular structures of the latter.

The sample is preferably transparent or sufficiently translucent to be able to allow an image to be formed by the image sensor.

The sample lies in a plane $P_{10}$, called the sample plane, perpendicular to the axis of propagation Z. It is held on a holder $10s$. The sample plane is described by two orthogonal axes X and Y, which define coordinates x and y, respectively.

The distance D between the light source 11 and the sample 10 is preferably larger than 1 cm. It is preferably comprised between 2 and 30 cm. Preferably, the light source, seen by the sample, may be considered to be point-like. This means that its diameter (or its diagonal) is preferably smaller than one tenth, and better still one hundredth, of the distance between the sample and the light source. Thus, the light preferably reaches the sample in the form of plane waves, or waves that may be considered as such.

The light source 11 may be a laser diode or a light-emitting diode. It may be associated with a diaphragm 18 or spatial filter. The aperture of the diaphragm is typically comprised between 5 µm and 1 mm, and preferably between 50 µm and 500 µm. The diaphragm may be replaced by an optical fibre, a first end of which is placed facing the light source 11, and a second end of which is placed facing the sample 10.

Preferably, the width of the spectral emission band $\lambda\alpha$ of the incident light wave 12 is less than 100 nm, and preferably less than 20 nm or 10 nm. The term "spectral bandwidth" is understood to mean the full width at half maximum of said spectral band.

The sample 10 is placed between the light source 11 and an image sensor 16. The latter preferably extends in parallel, or substantially in parallel, to the plane along which the sample extends. The term "substantially parallel" means that the two elements may not be rigorously parallel, an angular tolerance of a few degrees, smaller than 20° or 10°, being acceptable.

The image sensor 16 is able to form an image in a detection plane $P_0$. In the example shown, it is a question of a CCD or CMOS image sensor comprising a matrix-array of pixels. CMOS sensors are preferred because the size of the pixels is smaller, this allowing images, the spatial resolution of which is more favourable, to be acquired. The detection plane $P_0$ preferably extends perpendicular to the propagation axis Z of the incident light wave 12. Thus, the detection plane $P_0$ is parallel to the sample plane $P_{10}$. The image sensor comprises pixels, with each pixel being associated with coordinates (x, y).

The distance d between the sample plane $P_{10}$ and the matrix-array of pixels of the image sensor 16 is preferably comprised between 50 µm and 2 cm, and more preferably comprised between 100 µm and 2 mm.

In the device shown in FIG. 1A, the absence of magnifying or image-forming optics between the image sensor 16 and the sample 10 will be noted. This does not rule out the possible presence of focusing microlenses level with each pixel of the image sensor 16, these microlenses not having the function of magnifying the image acquired by the image sensor. One of the advantages of the lensless configuration shown in FIG. 1A is the large observed field, allowing a large volume of sample to be addressed simultaneously. This allows a plurality of particles to be observed simultaneously, and thus a rapid characterization of the sample to be obtained. The observed field depends on the size of the image sensor, it being slightly smaller than the detection area of the latter, because of the spacing between the pixels of the sensor and the sample. The observed field is generally larger than 10 mm$^2$, and is typically comprised between 10 mm$^2$ and 1000 mm$^2$, this being significantly larger than that obtained with a microscope. The size of the image sensor may for example be 22 mm×15 mm or 24 mm×36 mm.

Under the effect of the incident light wave 12, the particles $10p$ present in the sample may create a diffracted wave 13 that is liable, in the detection plane $P_0$, to produce interference, in particular with a portion 12' of the incident light wave 12 transmitted by the sample. Moreover, the sample may absorb a portion of the incident light wave 12. Thus, the light wave 14, transmitted by the sample, and to which the image sensor 16 is exposed, which light wave is designated by the term "exposure light wave", comprises:
 a component 13 resulting from the diffraction of the incident light wave 12 by each particle of the sample;
 a component 12' resulting from the transmission of the incident light wave 12 by the sample, one portion of said light wave possibly being absorbed in the sample.

These components interfere in the detection plane. Thus, each image acquired by the image sensor contains interference patterns (or diffraction patterns).

A processing unit 20, for example a microprocessor, is able to process each image $I_{P0}$ acquired by the image sensor 16. In particular, the processing unit 20 comprises a microprocessor that is connected to a programmable memory 22 in which is stored a sequence of instructions for performing the image-processing and computing operations described in this description. The processor may be coupled to a screen 24 allowing images acquired by the image sensor 16 or computed by the processor 20 to be displayed.

The image $I_{P0}$ acquired by the image sensor forms a hologram. It generally does not allow a satisfactory visual representation of the sample, in particular when the sample comprises diffracting elements that are very close to one another. This is notably the case when the sample contains particles that are very close to one another, or when the sample is a thin slide of biological tissue.

The image $I_{P0}$ acquired by the image sensor 16, which image is also called a hologram, may be the subject of a reconstruction, called the holographic reconstruction. As is known in the field of holographic imaging, a holographic propagation operator h may be applied to the image acquired by the image sensor, so as to compute a complex expression A(x,y,z) representative of the exposure light wave 14, at any point of coordinates (x,y,z) in space, and more particularly between the image sensor and the sample. The coordinates (x, y) designate coordinates parallel to the detection plane $P_0$.

The complex expression A(x,y,z) of the exposure light wave 14, at any point of coordinates (x,y,z) in space, is such that:

$$A(x, y, z) = M(x, y, z)e^{i\varphi(x,y,z)} \qquad (1)$$

where M(x,y,z) and φ(x,y,z) correspond to the modulus and phase of the exposure light wave 14, respectively, and $i^2=-1$.

Thus, the complex expression A is a complex quantity, the argument and modulus of which are representative of the phase and intensity of the exposure light wave 14 detected by the image sensor 16 to form the image $I_{P0}$, respectively.

From the image $I_{P0}$ acquired by the image sensor 16, it is possible to obtain a complex expression for the exposure light wave 14 via a convolution implementing a holographic propagation operator, according to the expression:

$$A(x, y, z) = \sqrt{I_{P0}(x_0, y_0, z_0)} * h_{xyz}, \quad (2)$$

\* designating convolution.

$x_0$, $y_0$, $z_0$ are coordinates in the detection plane $P_0$.

The function of the holographic propagation operator h is to describe the propagation of light between a point of coordinates $(x_0, y_0, z_0)$ in the detection plane $P_0$ and a point of coordinates $(x,y,z)$. It may be a Fresnel operator, such as:

$$h_{xyz} = \frac{1}{i\lambda z} e^{j2\pi \frac{z}{\lambda}} \exp\left(i\pi \frac{x^2 + y^2}{\lambda z}\right) \quad (3)$$

It is conventional to convolve the image $I_{P0}$ acquired by the image sensor (or the image $\sqrt{I_{P0}}$) and the propagation operator h. This allows a complex image $A_z$ representing a spatial distribution of the complex expression A in a reconstruction plane $P_z$, lying at a distance $|z|$ from the detection plane $P_0$, along the Z-axis, to be obtained. When the reconstruction plane corresponds to the sample plane $P_{10}$, a complex image $A_{10}$ is obtained that corresponds to a complex image of the sample.

However, as indicated with reference to the prior art, a complex image reconstructed according to (2) is generally affected by reconstruction noise that may be significant. This is due to the fact that the image acquired by the image sensor does not contain any information relating to the phase of the exposure light wave 14.

The inventors provide a simple method allowing this problem to be remedied.

Figure 2A:
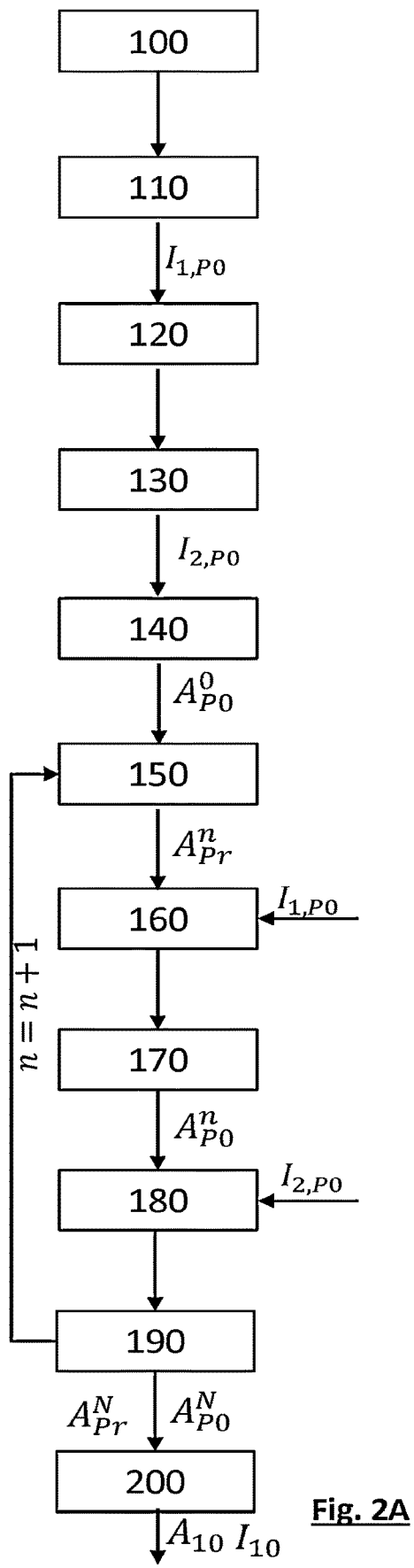
FIG. 2A shows the main steps of a holographic-reconstruction method according to the invention.

The main steps are shown in FIG. 2A, and described below.

Step 100: Illuminating the sample 10 using the light source 11.

Step 110: Acquiring a first image $I_{1,P0}$ of the sample 10 using the image sensor 16, this image forming a first hologram. The first image $I_{1,P0}$ is acquired in the detection plane $P_0$.

During the acquisition of the first image $I_{1,P0}$, the exposure light wave 14 propagates between the sample 10 and the image sensor 20 along a first optical path $L_1$. The optical path corresponds to the distance travelled multiplied by the refractive index of the medium through which the light wave 14 propagates between the sample and the image sensor.

In this example, during the acquisition of the first image, the space lying between the sample and the image sensor is filled with air.

Step 120: Modifying the optical path.

In this step, the optical path followed by the exposure light wave, during the acquisition of the first image, is modified. The optical path is modified without moving the image sensor relative to the sample. The distance between the image sensor 16 and the sample 10 remains the same as during the acquisition of the first image.

Figure 1B:
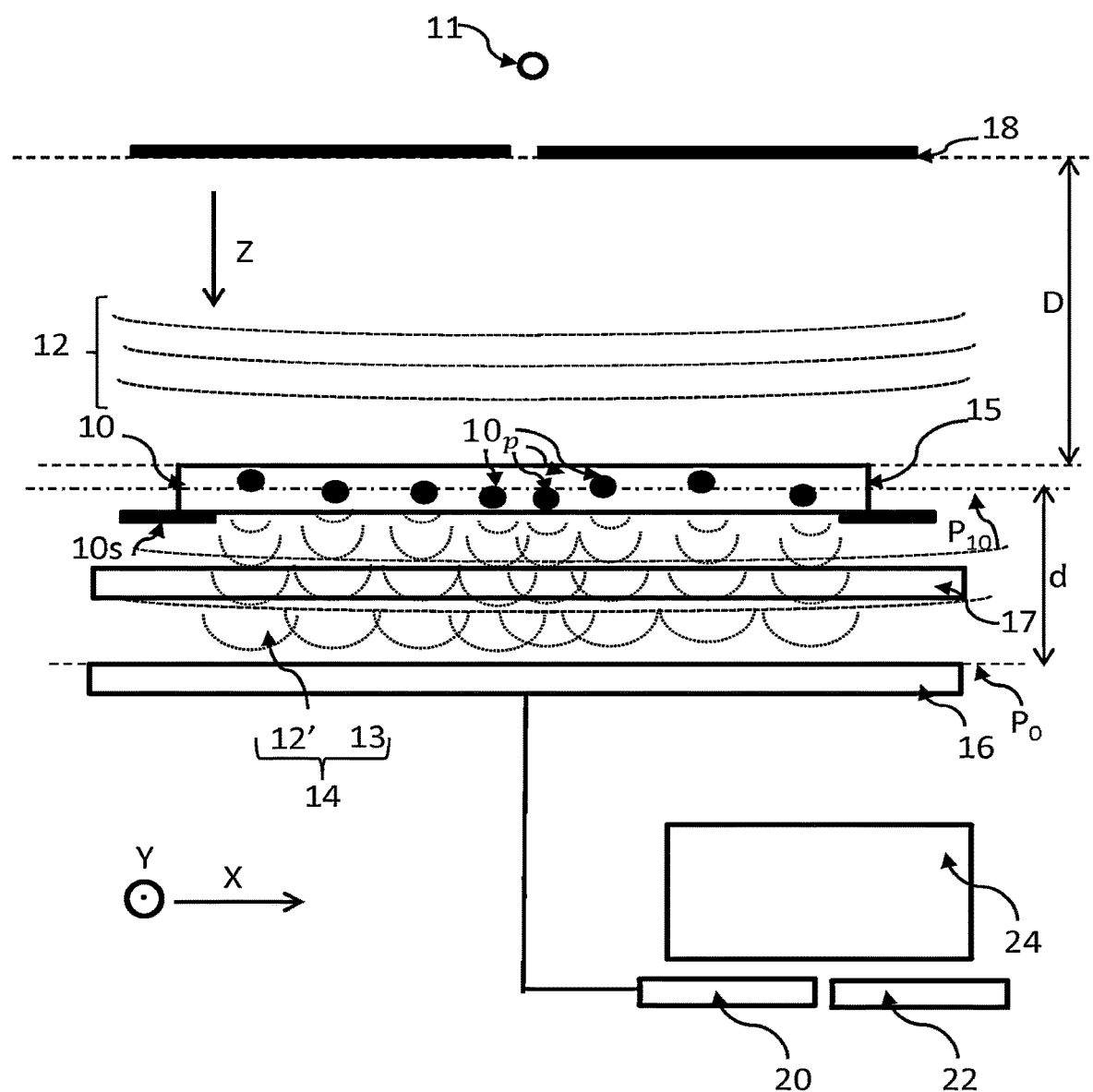

The optical path is modified by modifying an optical refractive index, between the image sensor and the sample. In one portion of the space separating the sample from the image sensor, the optical path is modified. In this example, as shown in FIG. 1B, the optical path is modified by inserting, between the sample and the image sensor, a transparent material having a refractive index different from that of air. It may for example be a question of a plate 17, of millimetric thickness, of a material such as glass, or a transparent polymer, or water. Depending on the refractive index of the material, its interposition between the sample and the image sensor induces a decrease or an increase in the optical path travelled by the exposure light wave 14. In this example, the interposition of the plate 17, the material of which has a refractive index higher than that of air, engenders an increase in the optical path travelled by the exposure light wave.

Generally, during the acquisition of the first image, a first material, of a first refractive index $n_1$, lies between the sample and the image sensor. The modification of the optical path consists in replacing all or some of the first material by a second material, having a second refractive index $n_2$ different from the first refractive index $n_1$.

The modification of the optical path leads to a variation in the first optical path $L_1$, which variation is positive or negative and denoted $\delta L$.

Thus, if $L_2$ is the second optical path, $L_2 = +\delta L$.

Step 130: Acquiring a second image $I_{2,P0}$ of the sample 10 using the image sensor 16, this image forming a second hologram. Just like the first image, the second image is acquired in the detection plane $P_0$. During the acquisition of the second image, the exposure light wave travels the second optical path $L_2$, which is different from the first optical path $L_1$, while the distance between the image sensor and the sample remains unchanged.

Step 140: Initialization.

In this step, a starting image, chosen from the first image and the second image, is used to form an initialization image $A_{P0}^0$. In this example, the starting image is the first image $I_{2,P0}$ and the initialization image is the square root of the first image:

$$A_{P0}^0 = \sqrt{I_{1,P0}}.$$

Thus, each pixel (x, y) of the image $A_{p0}^0$ is such that $A_{P0}^0 = \sqrt{I_{1,P0}(x,y)}$. Steps 150 to 180 are performed iteratively, each iteration being assigned a rank n.

Step 150: Propagation.

In this step, the initial image $A_{P0}^0$, or the image $A_{P0}^{n-1}$ resulting from a previous iteration, in the detection plane $P_0$, is propagated to a reconstruction plane $P_r$, which is distant from the detection plane $P_0$. The distance between the detection plane $P_0$ and the reconstruction plane $P_r$ is equal to the variation in optical path $\delta L$ resulting from step 120. Thus, in this step, a reconstructed complex image $A_{Pr}^n$ is obtained in the reconstruction plane $P_r$, such that:

$$A_{Pr}^n = A_{P0}^{n-1} * h_{\delta L} \quad (4)$$

The exponent n designates the rank of the iteration.

Figure 2B:
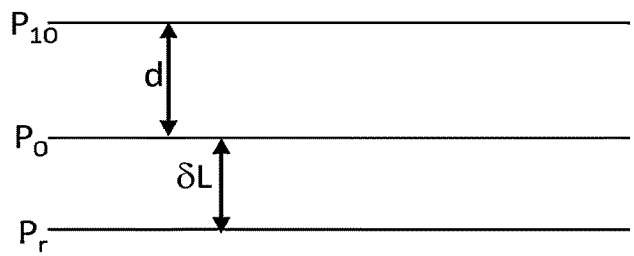
FIG. 2B is an illustration of the sample plane, detection plane and reconstruction plane mentioned with reference to the steps of the holographic-reconstruction method.

FIG. 2B illustrates the position of the reconstruction plane $P_r$ with respect to the detection plane $P_d$ and with respect to the sample plane $P_{10}$. In FIG. 2B, $\delta L > 0$.

$h_{\delta L}$ corresponds to a propagation operator that propagates the image a distance $\delta L$.

Step 160: Updating the complex image $A_{Pr}^n$ in the reconstruction plane $P_r$.

In this step, the complex image $A_{P2}''$ resulting from step 150 is updated depending on a destination image. The destination image is chosen from the first image and the second image, and does not correspond to the starting image. In other words if the starting image, on the basis of which the initialization was carried out, is the first image $I_{1,P0}$, the destination image is the second image $I_{2,P0}$. Conversely, if the starting image is the second image $I_{2,P0}$, the destination image is the first image $I_{1,P0}$.

The complex image $A_{Pr}''$ formed in the reconstruction plane have a modulus and a phase. The update consists in replacing the modulus of the complex image $A_{P2}''$ depending on the destination image. More precisely, it is a question of replacing the modulus of the complex image $A_{Pr}''$ by the modulus of the destination image. In this example, the destination image is the second image $I_{2,P0}$.

Thus, the updating consists in replacing the modulus of $A_{Pr}''$ by $\sqrt{I_{2,P0}}$.

Thus, for any pixel (x, y) of the image of the image $A_{Pr}''$:

$$\mathrm{mod}(A_{Pr}^n(x, y)) = \sqrt{I_{2,P0}(x, y)} \tag{5}$$

mod designates modulus.

Step 170: Back-propagation

In this step, the image resulting from step 160 is back-propagated to the detection plane $P_0$:

$$A_{P0}^n = A_{Pr}^n * h_{-\delta L} \tag{6}$$

Step 180: Updating the complex image $A_{P0}''$ in the detection plane $P_0$.

In this step, the complex image resulting from step 170 is updated depending on the starting image. More precisely, it is a question of replacing the modulus of the complex image $A_{P0}''$ by the modulus of the starting image. In this example, the starting image is the first image $I_{1,P0}$.

Thus, the updating consists in replacing the modulus of $A_{P0}''$ by $\sqrt{I_{1,P0}}$.

Thus, for any pixel (x, y) of the image $A_{p0}''$, mod $(A_{P0}''(x,y)) = \sqrt{I_{1,P0}(x,y)}$.

Step 190: Reiteration.

In this step, the image $A_{P0}''$ resulting from step 180 is used in step 150 of a following iteration.

The iterations of steps 150 to 190 continue until a criterion for stopping the iterations is met. It may be a question of a pre-set number of iterations. The criterion for stopping the iterations may also be a small difference between the respective phases of two complex images (formed either in the detection plane or in the reconstruction plane) in two consecutive iterations. In each iteration, a mean phase deviation may be computed, this mean phase deviation being:
- either a mean deviation between the phases of each pixel of the complex image $A_{P0}''$ formed, in the reconstruction plane $P_r$, in step 150 of the iteration and of the previous iteration;
- or a mean deviation between the phases of each pixel of the complex image $A_{P0}''$ formed, in the detection plane $P_0$, in step 170 of the iteration and of the proceeding iteration.

When the mean deviation drops below a pre-set threshold value, or when a difference in mean deviations, between two successive iterations, drops below a pre-set threshold, the criterion for stopping the iterations is met.

Step 200: Obtaining an image of the sample.

Following the iterations, a complex image $A_{Pr}^N$ or $A_{P0}^N$ considered to be representative of the exposure light wave 14 is obtained. N is the rank of the last iteration.

Either of the complex images is propagated to the sample plane $P_{10}$, so as to obtain a complex image of the sample $A_{10}$. For example, the image $A_{P0}^N$ is propagated according to the expression:

$$A_{10} = A_{P0}^N * h_d \tag{7}$$

where d designates the distance between the sample plane $P_{10}$ and the detection plane $P_0$.

Alternatively, the image $A_{Pr}^N$ is propagated, in which case:

$$A_{10} = A_{Pr}^N * h_{d+\delta L} \tag{8}$$

It is then possible to form an observation image $I_{10}$ of the sample, allowing the latter to be viewed. The observation image is formed from the modulus of the complex image of the sample $A_{10}$, or its phase, or its real part, or its imaginary part.

Experimental Trials

The method described above was implemented using an LED light source (LED being the well-known acronym of light-emitting diode) that emitted in a spectral band centred on the wavelength of 450 nm (spectral width of 15 nm), and that had a diameter of 62 µm. The distance between the light source and the sample was 16 cm. The sample was a transparent USAF test chart. The image sensor was a monochromatic CMOS sensor (22.3 mm×14.9 mm—pixel size: 4.3 µm×4.3 µm). The holographic propagation was carried out according to the principles described in section 3.2 of the publication McLeod E. and Ozcan A., "Unconventional methods of imaging: computational microscopy and compact implementation", 2016, Rep. Prog. Phys. 79 076001.

A first image was acquired, with an air gap of 500 µm thickness between the sample and the image sensor. A second image was acquired, with the 500 µm air gap between the sample and the image sensor filled with water (refractive index=1.33).

The first image was used as starting image. During the implementation of the algorithm, the reconstruction plane $P_r$ was offset by 165 µm from the detection plane $P_0$.

The complex image generated by the algorithm, in the detection plane, was propagated over a distance of 2200 µm, this distance corresponding to the optical length, in air, between the detection plane and the sample.

Figure 3A:
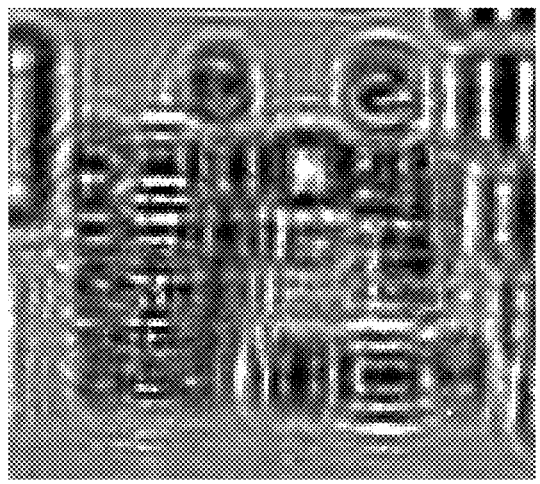
FIG. 3A shows a hologram of a test chart, said hologram having been acquired in a lensless-imaging configuration.

FIG. 3A shows a hologram, corresponding to the first image.

Figure 3B:
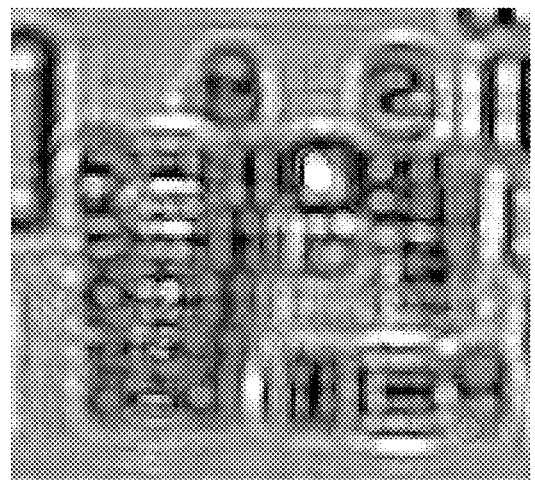
FIGS. 3B and 3C are images of the test chart, said images having been obtained by applying digital reconstructions according to two prior-art methods, respectively.
Figure 3C:
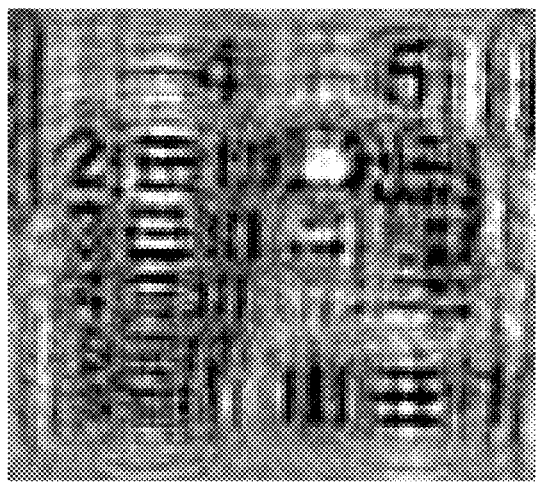

FIG. 3B shows a reconstruction carried out using a prior-art algorithm, implementing a mask. FIG. 3C shows a reconstruction carried out using another prior-art algorithm, in which a plurality of images are acquired while varying the distance between the image sensor and the sample.

Figure 3D:
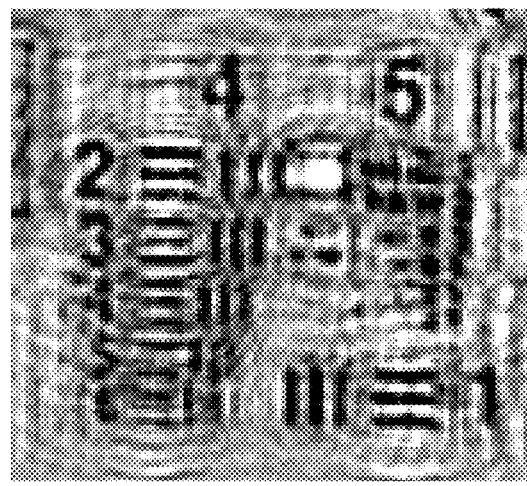
FIG. 3D is an image of the test chart obtained by implementing the invention.

FIG. 3D is an image of the modulus of the complex image resulting from the implementation of the algorithm.

It may be seen that the spatial resolution of the image resulting from the algorithm (FIG. 3D) is higher than that of the hologram (FIG. 3A), and that of the image of FIG. 3B.

It is comparable to the image of FIG. 3C, the latter having been obtained from images formed while moving the image sensor relative to the sample.

Variant

Figure 4:
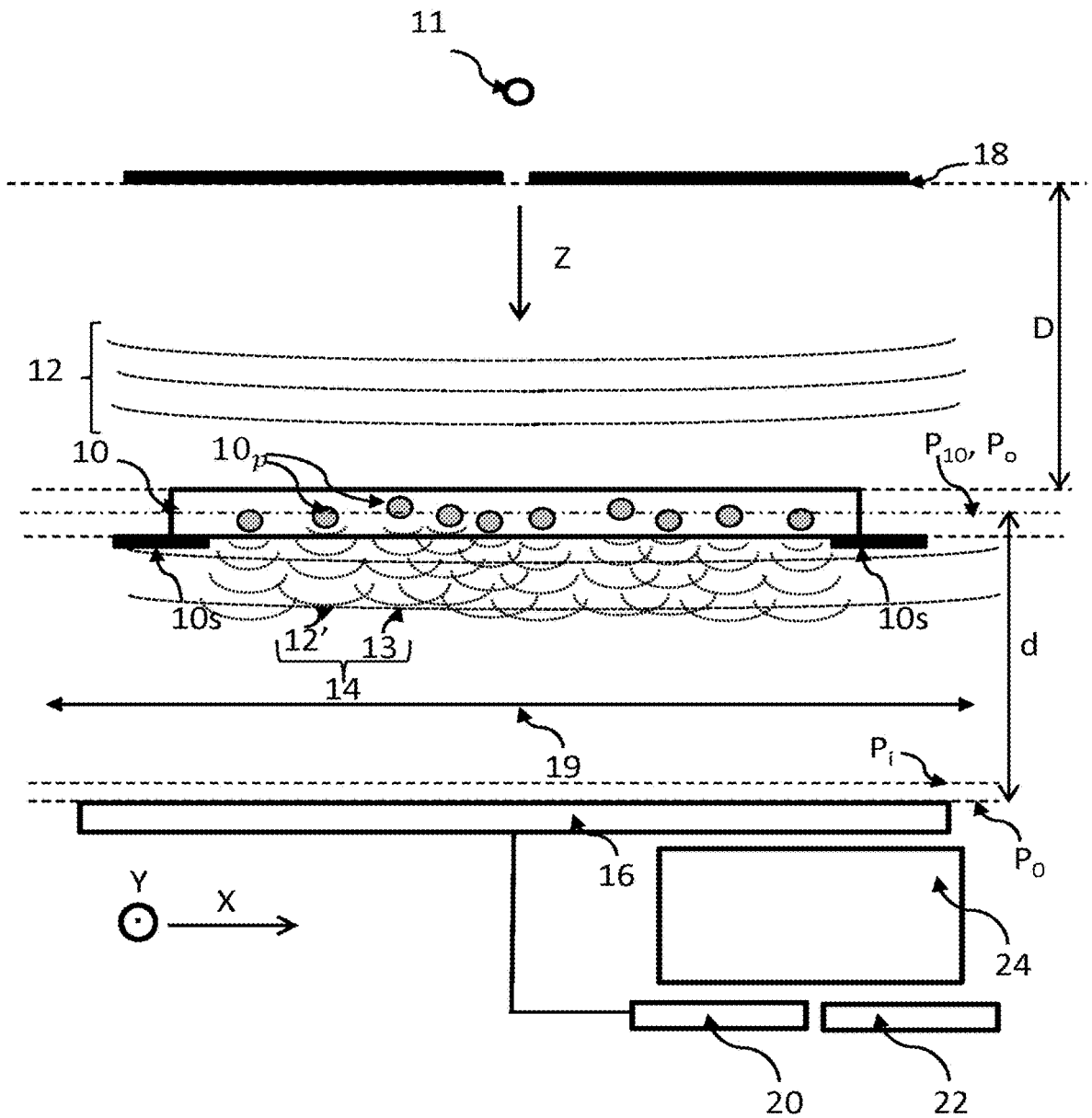
FIG. 4 shows a second example of a device allowing the invention to be implemented, in a defocused imaging configuration.

FIG. 4 schematically shows a device allowing the invention to be implemented. Unlike the device shown in FIG. 1A, the device of FIG. 4 comprises an image-forming optical system 19. The optical system 19 defines an image plane and an object plane. The optical system may be a lens or an objective. During the acquisition of the image of the sample, the image sensor is placed in a defocused configuration. The detection plane is offset with respect to the image plane $P_i$ and/or the plane in which the sample lies is offset with respect to the object plane $P_o$. The offset is generally small, preferably being less than 1 mm, and typically lying in a range of 50 μm-500 μm. In the example of FIG. 4, the detection plane is offset with respect to the image plane and the plane in which the sample lies coincides with the object plane.

The invention will possibly be employed to observe samples in the field of biology or health, in the field of environmental control or in other industrial fields, including the food industry.

The invention claimed is:

1. A method for obtaining an image of a sample, the method comprising:
   (a) illuminating the sample using a light source configured to emit a light wave that propagates to the sample;
   (b) acquiring, using an image sensor, a first image of the sample, said first image being formed in a detection plane, the sample being placed between the light source and the image sensor, the first image being representative of an exposure light wave propagating from the sample, to the image sensor, along a first optical path;
   (c) modifying an optical refractive index, between the image sensor and the sample, so as to obtain a variation in the optical path of the exposure light wave;
   (d) acquiring, using the image sensor, a second image of the sample, the second image being formed in the detection plane, the second image being representative of the exposure light wave propagating, from the sample, to the image sensor, along a second optical path, the second optical path corresponding to the first optical path plus the variation in optical path resulting from (c);
   (e) implementing an iterative algorithm comprising the substeps of:
      (ei) forming an initial image, in the detection plane, from a starting image chosen from the first image and the second image;
      (eii) applying a holographic propagation operator to the initial image or to a new complex image formed in the detection plane, resulting from a previous iteration, so as to obtain a reconstructed complex image in a reconstruction plane, a distance between the reconstruction plane and the detection plane corresponding to the variation in optical path obtained in (c), the reconstructed complex image formed in the reconstruction plane having a modulus and a phase defined in each pixel of the reconstructed complex image;
      (eiii) in the reconstruction plane, updating the modulus of the reconstructed complex image formed in the reconstruction plane to form an updated complex image, resulting from (eii), in each of the pixels thereof, depending on a destination image, the destination image being chosen from the first image or the second image, the destination image being different from the starting image chosen in (ei);
      (eiv) applying a holographic propagation operator to the updated complex image of (eiii), to form the new complex image in the detection plane, the new complex image formed in the detection plane having a modulus and a phase defined in each pixel of said image;
      (ev) updating the modulus of the new complex image formed in the detection plane in step (eiv), in each of the pixels thereof, depending on the starting image; and
      (evi) reiterating substeps (eii) to (ev) until a criterion for stopping the iterations is met; and
   (f) obtaining the image of the sample from one of the new complex image resulting from step (e), the new complex image being formed in the detection plane, or the updated complex image resulting from step (e), the updated complex image being formed in the reconstruction plane.

2. The method according to claim 1, wherein:
   step (eiii) further comprises updating the new complex image, in the reconstruction plane, by replacing, in each of the pixels thereof, the modulus of the new complex image by a square root of the destination image; and
   step (ev) further comprises updating the new complex image, in the detection plane, by replacing, in each of the pixels thereof, the modulus of the new complex image by a square root of the starting image.

3. The method according to claim 1, wherein the criterion for stopping the iterations is a pre-set number of iterations of substeps (eii) to (ev).

4. The method according to claim 1, wherein substep (evi) of each iteration, after the first iteration, further comprises computing a mean phase deviation, the mean phase deviation comprising:
   a mean deviation between the phases of each pixel of the reconstructed complex image formed, in the reconstruction plane, in substep (eii) of the iteration and in the previous iteration; or
   a mean deviation between the phases of each pixel of the new complex image formed, in the detection plane, in substep (eiv) of the iteration and in the previous iteration; and
   the criterion for stopping the iterations is met when the mean deviation drops below a pre-set threshold or when a difference in mean deviation, between two successive iterations, drops below a pre-set threshold.

5. The method according to claim 1, wherein:
   during the acquisition of the first image, a first material, having a first refractive index, lies between the sample and the image sensor;
   step (c) further comprises replacing a portion of the first material by a second material, the second material having a second refractive index different from the first refractive index so that the second optical path is longer or shorter than the first optical path.

6. The method according to claim 1, wherein a distance between the image sensor and the sample is identical in steps (b) and (d).

7. The method according to claim 1, wherein:
   an optical system lies between the sample and the image sensor, the optical system defining an object plane and an image plane;
   the sample lies in a sample plane, the sample plane being offset with respect to the object plane; and/or the detection plane is offset with respect to the image plane.

8. The method according to claim 1, wherein the step (f) further comprises obtaining the image of the sample by applying a reconstruction operator to:
the updated complex image formed in the detection plane in a last iteration of substeps (eii) to (ev); or
the updated complex image formed in the reconstruction plane, in the last iteration of substeps (eii) to (ev).

9. A device for observing a sample, the device comprising:
a light source configured to illuminate the sample;
an image sensor configured to acquire an image of the sample; and
a sample holder configured to hold the sample between the light source and the image sensor,
wherein the device is configured to allow to be placed, between the sample and the image sensor:
a first material, of a first refractive index, such that the image sensor is configured to acquire a first image of the sample when the first material is placed between the sample and the image sensor; or
a second material, instead of the first material, of a second refractive index different from the first refractive index, such that the image sensor is configured to acquire a second image of the sample, when the second material is placed between the sample and the image sensor; and
the device further comprises processing circuitry configured to implement steps (e) and (f) of the method according to claim 1.

10. The device according to claim 9, wherein the sample holder is fixed with respect to the image sensor, such that a distance between the sample and the image sensor is identical during the acquisition of the first image and during the acquisition of the second image.

11. The device according to claim 9, wherein:
an optical system lies between the sample and the image sensor, the optical system defining an object plane and an image plane;
the sample lies in a sample plane, the sample plane being offset with respect to the object plane; and/or
the detection plane is offset with respect to the image plane.

* * * * *